United States Patent
Dittmann (10) Patent No.: US 12,246,600 B2
(45) Date of Patent: Mar. 11, 2025

(54) SELF-PROPELLED CONSTRUCTION MACHINE AND METHOD FOR CONTROLLING A SELF-PROPELLED CONSTRUCTION MACHINE

(71) Applicant: Wirtgen GmbH, Windhagen (DE)

(72) Inventor: Siegbert Dittmann, Vettelschoss (DE)

(73) Assignee: Wirtgen GmbH, Windhagen (DE)

(*) Notice: Subject to any disclaimer, the term of this patent is extended or adjusted under 35 U.S.C. 154(b) by 78 days.

(21) Appl. No.: 17/991,109

(22) Filed: Nov. 21, 2022

(65) Prior Publication Data

US 2023/0150351 A1     May 18, 2023

Related U.S. Application Data

(62) Division of application No. 17/124,682, filed on Dec. 17, 2020, now Pat. No. 11,511,618.

(30) Foreign Application Priority Data

Dec. 23, 2019   (DE) ................. 10 2019 135 668.7

(51) Int. Cl.
*B60K 7/00* (2006.01)
*B62D 15/02* (2006.01)
(Continued)

(52) U.S. Cl.
CPC .......... *B60K 7/0015* (2013.01); *B62D 15/021* (2013.01); *E01C 23/088* (2013.01); *F15B 15/1409* (2013.01)

(58) Field of Classification Search
CPC ........ B60K 7/0015; B60K 7/00; B60K 17/14; B60K 17/04; B60K 17/00; B62D 15/021;
(Continued)

(56) References Cited

U.S. PATENT DOCUMENTS 5,473,895 A * 12/1995 Bausenhart ............. F16H 61/46
60/448
5,775,453 A *  7/1998 Williams ................ F16H 61/46
180/197

(Continued)

FOREIGN PATENT DOCUMENTS

DE   102004040135 B3   12/2005
DE   102013106047 A1    6/2014
EP       1350658 A1    10/2003

OTHER PUBLICATIONS

European Search Report for corresponding patent application No. EP 20 21 6078, dated May 31, 2021, 8 pages.

*Primary Examiner* — James M Dolak
(74) *Attorney, Agent, or Firm* — Lucian Wayne Beavers; Patterson Intellectual Property Law, PC (57) ABSTRACT

The invention relates to a self-propelled construction machine, in particular a road milling machine, stabiliser, recycler or surface miner, which has a machine frame 2 supported by at least three running gears 10A, 10B, 11A, 11B, a drive device 14 for driving at least two running gears, and a work roller 4 arranged on the machine frame. The invention also relates to a method for controlling a construction machine of this kind. The drive device 14 comprises adjustable hydraulic motors 15, 16, 17, 18 associated with the drivable running gears, which hydraulic motors have a displacement volume Vg that can be varied by an adjusting device 15A, 16A, 17A, 18A, and comprises at least one adjustable travel drive-hydraulic pump 19 driven by at least one drive motor to supply the hydraulic motors with a variable total volume flow Q of hydraulic fluid. In addition, a controller 28 is provided which is configured in such a way that a partial volume flow $Q_1, Q_2, Q_3, Q_4$ is determined for each adjustable hydraulic motor 15, 16, 17, 18 from the total volume flow Q provided by the at least one travel drive- (Continued)

hydraulic pump 19, by means of which partial volume flow the particular hydraulic motor is to be operated, and when the speed n of an adjustable hydraulic motor increases as a result of slippage of the running gear associated with the adjustable hydraulic motor, the adjusting device of the adjustable hydraulic motor is controlled in such a way that a displacement volume Vg is set for the adjustable hydraulic motor, at which displacement volume the partial volume flow determined for the adjustable hydraulic motor is maintained. The self-propelled construction machine according to the invention is characterised in that a hydraulic flow divider is not required.

9 Claims, 5 Drawing Sheets

(51) Int. Cl.
*E01C 23/088* (2006.01)
*F15B 15/14* (2006.01)

(58) Field of Classification Search
CPC .............. B62D 15/00; B60Y 2200/41; B60Y 2200/414; F15B 15/1409; F15B 15/08; F15B 15/00; F16H 61/421; F16H 61/431; F16H 61/456; F16H 61/47; F16H 61/42; F16H 61/40; F16H 61/38; F16H 61/00; F16H 61/44; F16H 61/452; E01C 23/088; E01C 23/00; E01C 23/08; E01C 23/12; E01C 19/1004; E01C 19/02; E01C 19/00; E01C 21/00; E21C 47/00

See application file for complete search history.

(56) References Cited

U.S. PATENT DOCUMENTS

| | | | | |
|---|---|---|---|---|
| 7,044,257 | B2* | 5/2006 | Kempf | F16H 61/472 180/308 |
| 7,377,354 | B2* | 5/2008 | Smalley | B60K 17/10 180/305 |
| 7,628,240 | B2* | 12/2009 | Caldwell | B60K 17/10 180/242 |
| 7,798,272 | B2* | 9/2010 | Pruitt | F16H 61/472 180/197 |
| 7,942,604 | B2* | 5/2011 | Willis | B62D 7/026 404/85 |
| 8,016,069 | B2* | 9/2011 | Chisholm | B60W 10/06 180/308 |
| 8,055,411 | B2* | 11/2011 | Thomson | B62D 11/24 701/41 |
| 8,340,868 | B2* | 12/2012 | Thomson | B62D 11/24 701/41 |
| 8,751,132 | B2* | 6/2014 | Grepl | F16H 61/421 180/242 |
| 8,958,959 | B2* | 2/2015 | Von | B60W 10/30 123/565 |
| 9,266,420 | B2* | 2/2016 | Edward | B60K 17/356 |
| 9,328,821 | B2* | 5/2016 | Storer | E02F 9/2253 |
| 9,605,393 | B2* | 3/2017 | Schlenker | E01C 23/088 |
| 9,957,675 | B2* | 5/2018 | Marsolek | E01C 23/065 |
| 10,000,897 | B2* | 6/2018 | Reuter | B60K 25/02 |
| 10,718,431 | B2* | 7/2020 | Berning | F16H 7/22 |
| 11,015,304 | B2* | 5/2021 | Berning | E01C 19/004 |
| 11,193,247 | B2* | 12/2021 | Stinner | B62D 3/14 |
| 11,384,511 | B2* | 7/2022 | Ooouchi | F16H 61/4078 |
| 11,441,677 | B2* | 9/2022 | Weber | B60K 17/356 |
| 11,511,618 | B2* | 11/2022 | Dittmann | F16H 61/431 |
| 11,519,502 | B2* | 12/2022 | Johnson | F16H 61/431 |
| 11,821,511 | B2* | 11/2023 | Mueller | G01P 3/44 |
| 11,891,781 | B2* | 2/2024 | Hyodo | F16H 61/431 |
| 12,097,767 | B2* | 9/2024 | Ryton | B60K 17/354 |
| 12,128,725 | B2* | 10/2024 | Hoffmann | B62D 55/116 |
| 2003/0173133 | A1 | 9/2003 | Kempt et al. | |
| 2006/0039756 | A1 | 2/2006 | Lemke | |
| 2008/0128189 | A1 | 6/2008 | Pruitt et al. | |

\* cited by examiner

SELF-PROPELLED CONSTRUCTION MACHINE AND METHOD FOR CONTROLLING A SELF-PROPELLED CONSTRUCTION MACHINE

CROSS-REFERENCES TO RELATED APPLICATIONS

This application claims benefit of German Patent Application No. DE 10 2019 135 668.7, filed on Dec. 23, 2019, which is hereby incorporated by reference in its entirety.

BACKGROUND OF THE INVENTION

1. Field of the Invention

The invention relates to a self-propelled construction machine, in particular a road milling machine, stabiliser, recycler or surface miner, which has a machine frame that is supported by at least three running gears, and has a drive device for driving at least two running gears. The invention also relates to a method for controlling a construction machine of this kind.

2. Description of the Prior Art

Road milling machines, stabilisers, recyclers or surface miners have a rotating work roller which can be a milling or cutting drum. By means of the work roller, damaged road layers can be removed, existing road surfaces can be reprocessed, the ground can be prepared for road construction or mineral resources can be mined, for example.

Self-propelled construction machines have a machine frame which is supported by a chassis comprising a plurality of running gears, for example crawler tracks or wheels. Construction machines having front left and right running gears and rear left and right running gears, relative to the working direction, are known. However, the construction machines can also have only one front running gear and one left rear and one right rear running gear, or one left front and one right front running gear and only one rear running gear. In construction machines, at least one of the running gears is a steerable running gear. For example, in a small milling machine that has a front running gear and two rear running gears, the front running gear is a steerable running gear.

To drive the running gears, self-propelled construction machines generally have a hydrostatic drive device which comprises hydraulic motors associated with the drivable running gears and at least one travel drive-hydraulic pump driven by a drive motor, in particular an internal combustion engine, to supply the hydraulic motors with a volume flow of hydraulic fluid.

The travel drive-hydraulic pump is generally a variable displacement pump for providing a total volume flow of hydraulic fluid to supply the hydraulic motors, and the hydraulic motors are variable displacement motors. The variable displacement pump and the variable displacement motors each have an adjusting device by means of which the displacement volume can be varied. In this context, the displacement volume $V_g$ of a hydraulic motor or a hydraulic pump is understood to mean the amount of hydraulic fluid that the hydraulic motor or the hydraulic pump uses per revolution. The product of the displacement volume $V_g$ and the speed n of the hydraulic motor results in the volume flow Q, on which in turn the travel speed v of the self-propelled construction machine depends.

The self-propelled construction machines have a controller for controlling the travel drive-hydraulic pump in order to provide the hydraulic motors of the running gears with the volume flow of hydraulic fluid required for the desired travel speed.

To steer the running gears, self-propelled construction machines have a steering device that comprises steering device-operating devices associated with the steerable running gears, for example piston/cylinder arrangements, in order to adjust the direction of travel of the running gears.

The hydraulic system of the construction machines also has hydraulic lines for supplying and/or discharging the hydraulic fluid to the hydraulic motors and/or from the travel drive-hydraulic pump.

High demands are placed on the drive of self-propelled construction machines. Particularly high demands are placed on the traction of self-propelled construction machines that have work rollers, which represent an enormous resistance and therefore require high tensile forces from construction machines. If the construction machine does not advance evenly or jerks when cornering, the work result (milled surface) will deteriorate. The problem of inadequate traction arises in particular on slippery surfaces when there is a risk that one or more running gears may slip or spin.

The prior art includes self-propelled construction machines comprising hydraulic systems that do not have a so-called hydraulic flow divider. Construction machines of this type have the disadvantage that slipping or spinning of a running gear leads to a significant increase in the volume flow that is supplied to the running gear in question, since the speed of the running gear increases significantly when it slips, due to the lower torque. Consequently, given a total volume flow specified for all of the running gears, only greatly reduced partial volume flows are available to the other running gears, as a result of which the traction of the construction machine is considerably worsened overall. This can lead to the machine moving backwards on a slope. Insufficient traction leads to a significant reduction or irregularity in the advancing speed, which in turn has a negative effect on the work result.

SUMMARY OF THE DISCLOSURE

This problem can be solved using a hydraulic flow divider, which can divide the total volume flow into partial volume flows and keep both the volume flow and the speed of the hydraulic motor in question constant. Various types of flow dividers are known, including piston flow dividers and gear flow dividers. The disadvantage is that flow dividers of this kind are relatively expensive components. They have to withstand high pressures and work precisely. In addition, given the limited space available in a construction machine, they take up a relatively large amount of space. The many hydraulic lines that leave the flow divider and/or lead to the flow divider also require a relatively large amount of space. In practice, it has also been shown that a road milling machine comprising a control system of this kind can jerk when cornering, since the speed and volume flow are kept constant using the flow divider, which in turn has a negative effect on the milled surface.

The problem addressed by the invention is that of improving the traction of a self-propelled construction machine. Another problem addressed by the invention is that of improving cornering of a self-propelled construction machine. Another problem addressed by the invention is that of improving the work result of the construction machine, reducing the manufacturing costs of the construction machine, and providing additional space for other units and/or reducing the dimensions of the construction machine.

According to the invention, these problems are solved by the features of the independent claims. The dependent claims relate to preferred embodiments of the invention.

The self-propelled construction machine according to the invention has a machine frame which is supported by at least three running gears, of which at least two running gears are driven, and a drive device for driving at least two running gears. A construction machine according to the invention comprising four running gears can also comprise two independent travel drive trains, each circuit then having two drivable running gears.

The drive device comprises adjustable hydraulic motors associated with the drivable running gears, which hydraulic motors have a displacement volume that can be varied by means of an adjusting device, and at least one adjustable travel drive-hydraulic pump driven by at least one drive motor to supply the hydraulic motors with a variable total volume flow of hydraulic fluid. The at least one travel drive-hydraulic pump can be driven by at least one internal combustion engine that can run at a constant speed. The displacement volume of the travel drive-hydraulic pump can be varied by means of an adjusting device.

In addition, a control device is provided which is configured in such a way that the at least one adjustable travel drive-hydraulic pump is controlled in such a way that a total volume flow of hydraulic fluid is provided depending on the desired travel speed.

The control device is also configured in such a way that a partial volume flow is determined for each adjustable hydraulic motor from the total volume flow provided by the at least one travel drive-hydraulic pump, by means of which partial volume flow the particular hydraulic motor is to be operated, and when the speed (n) of an adjustable hydraulic motor increases as a result of slippage of the running gear associated with the adjustable hydraulic motor, the adjusting device of the adjustable hydraulic motor is controlled in such a way that a displacement volume is set for the adjustable hydraulic motor, at which displacement volume the partial volume flow determined for the adjustable hydraulic motor is maintained or is set or the determined partial volume flow is restored.

The self-propelled construction machine according to the invention is characterised in that a hydraulic flow divider is not required. If the control device for the drive device of the construction machine according to the invention is part of the control and processing unit of the construction machine, additional components are not required for controlling the drive. The traction of the construction machine can be significantly improved using the control system according to the invention. This also results in an improved work result. The control system according to the invention can be effective over the entire speed range and steering range of the construction machine. The control system prevents backwards movement on a slope.

According to a preferred embodiment, a control system for cornering is provided which takes into account the steering angle of the running gears. However, other variables and/or operating states in addition to the steering angle can also be taken into account in the control system. To ascertain the steering angle, the steerable running gear has a steering angle sensor which, depending on the steering angle, generates a steering angle signal which the control device receives. When the steering angle is equal to zero, i.e. when travelling straight ahead, the total volume flow is divided equally into the partial volume flows for the adjustable hydraulic motors. Equal division can also take place when the steering angle is very small. On the other hand, if the steering angle is not equal to zero, i.e. when cornering, the total volume flow is divided into the partial volume flows for the adjustable hydraulic motors depending on the particular curve radius, it being possible for the curve radius to be determined on the basis of the steering angle. If the volume flow of the hydraulic motors is adapted to the curve radius, the construction machine can travel smoothly in the curve without jerking. For cornering, the steering angle of the steerable running gears should be set in such a way that the extensions of axes that are perpendicular to the steerable running gears intersect at one point, i.e. the instantaneous centre of rotation (Ackermann condition).

When dividing the total volume flow into the partial volume flows, the various steering modes, for example "front axle steering", "rear axle steering", "front and rear axle steering" and/or "coordinated steering" or "crab steering" can be taken into account.

According to a particularly preferred embodiment, relative to the working direction, a steerable front right running gear and a steerable front left running gear and a steerable rear right running gear and a steerable rear left running gear are provided, a front right hydraulic motor being associated with the front right running gear and a front left hydraulic motor being associated with the front left running gear and a rear right hydraulic motor being associated with the rear right running gear and a rear left hydraulic motor being associated with the rear left running gear. The control system according to the invention is preferably provided for all of the running gears, but it can also be provided, for example, only for the front or rear running gears.

The total volume flow can be provided by means of one or more travel drive-hydraulic pumps. According to one embodiment, hydraulic fluid is provided for the front right and left hydraulic motors and the rear right and left hydraulic motors by means of a travel drive-hydraulic pump. According to another embodiment, a first travel drive-hydraulic pump and a second travel drive-hydraulic pump are provided, the volume flow for the front right hydraulic motor and the front left hydraulic motor being provided by means of the first travel drive-hydraulic pump and the volume flow for the rear right hydraulic motor and the rear left hydraulic motor being provided by means of the second travel drive-hydraulic pump.

BRIEF DESCRIPTION OF THE DRAWINGS

Embodiments of the invention are explained in detail below with reference to the drawings.

In the drawings.

DETAILED DESCRIPTION

Figure 1:
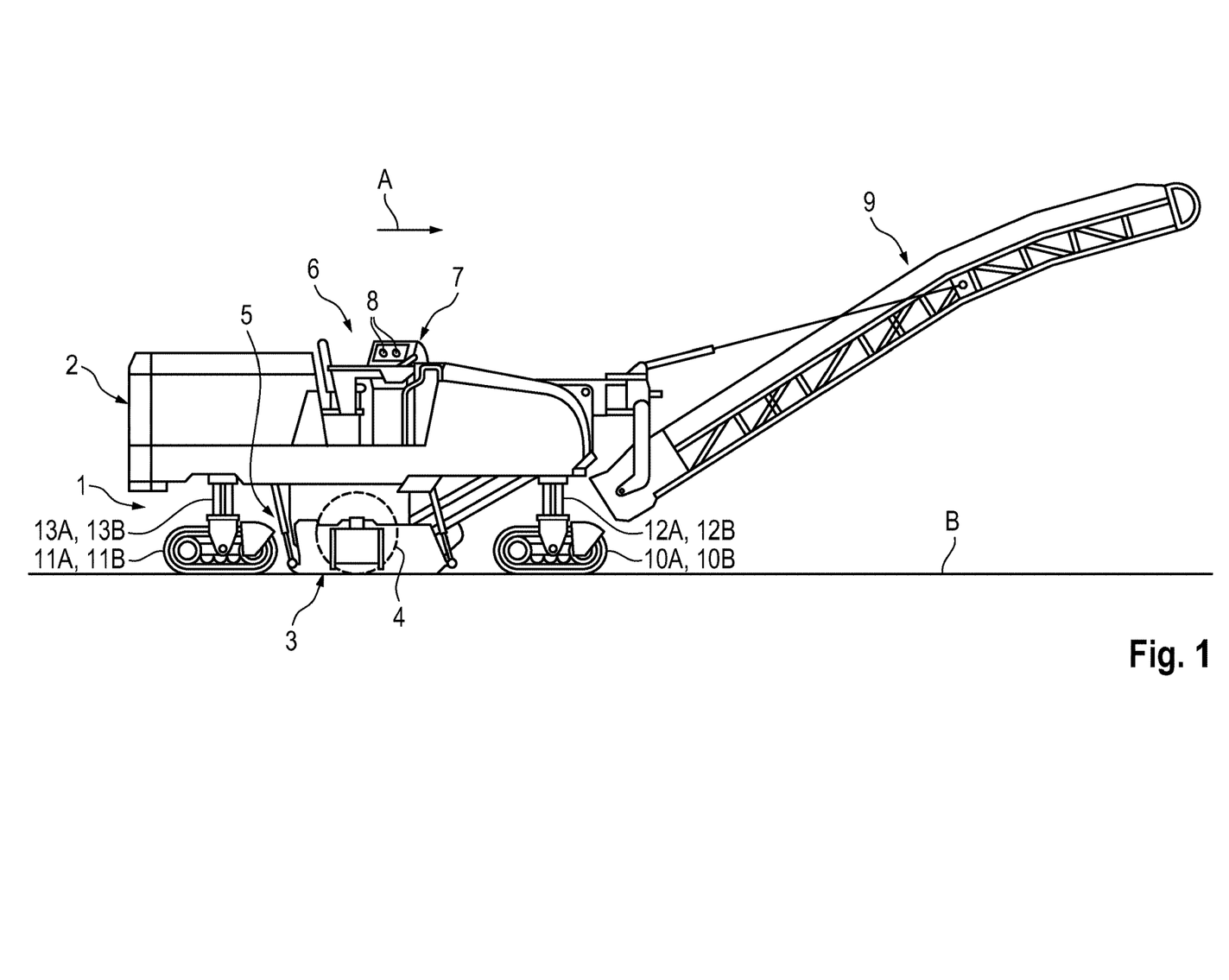
FIG. 1 shows an embodiment of a self-propelled construction machine that has two front and two rear steerable running gears.

FIG. 1 is a side view, as an example of a self-propelled construction machine, of a road milling machine for milling off road surfaces, which is a front-loading road milling machine. The construction machine has a machine frame 2 supported by a chassis 1, on which work equipment 3 is arranged, by means of which the work required for the construction project can be carried out. The work equipment 3 has a milling drum 4 (only suggested in FIG. 1) which is arranged in a milling drum housing 5. Above the milling drum housing 5 is the driver platform 6 on the machine frame 2, the platform having an operating panel 7 for the machine operator. The operating panel 7 has a plurality of operating elements 8 which the machine operator can operate. The milled material is removed by a conveyor 9 which is pivotally arranged on the front of the machine frame 2.

Relative to the working direction A, the construction machine has a front left running gear 10A and a front right running gear 10B and a rear left running gear 11A and a rear right running gear 11B. Front and rear lifting devices 12A, 12B and 13A, 13B are provided on the running gears so that the height and inclination of the machine frame 2 relative to the ground surface B can be varied by retracting or extending the lifting devices.

In the present embodiment of a self-propelled construction machine, all of the running gears 10A, 10B and 11A, 11B are drivable and steerable running gears. However, the construction machine can, for example, also have only two rear, drivable and non-steerable running gears and one front, non-drivable and steerable running gear. To drive the running gears, the construction machine has a hydrostatic drive device 14, which is described in detail below with reference to FIG. 2. The hydrostatic drive device 14 may also be referred to as a hydraulic drive 14.

Figure 2:
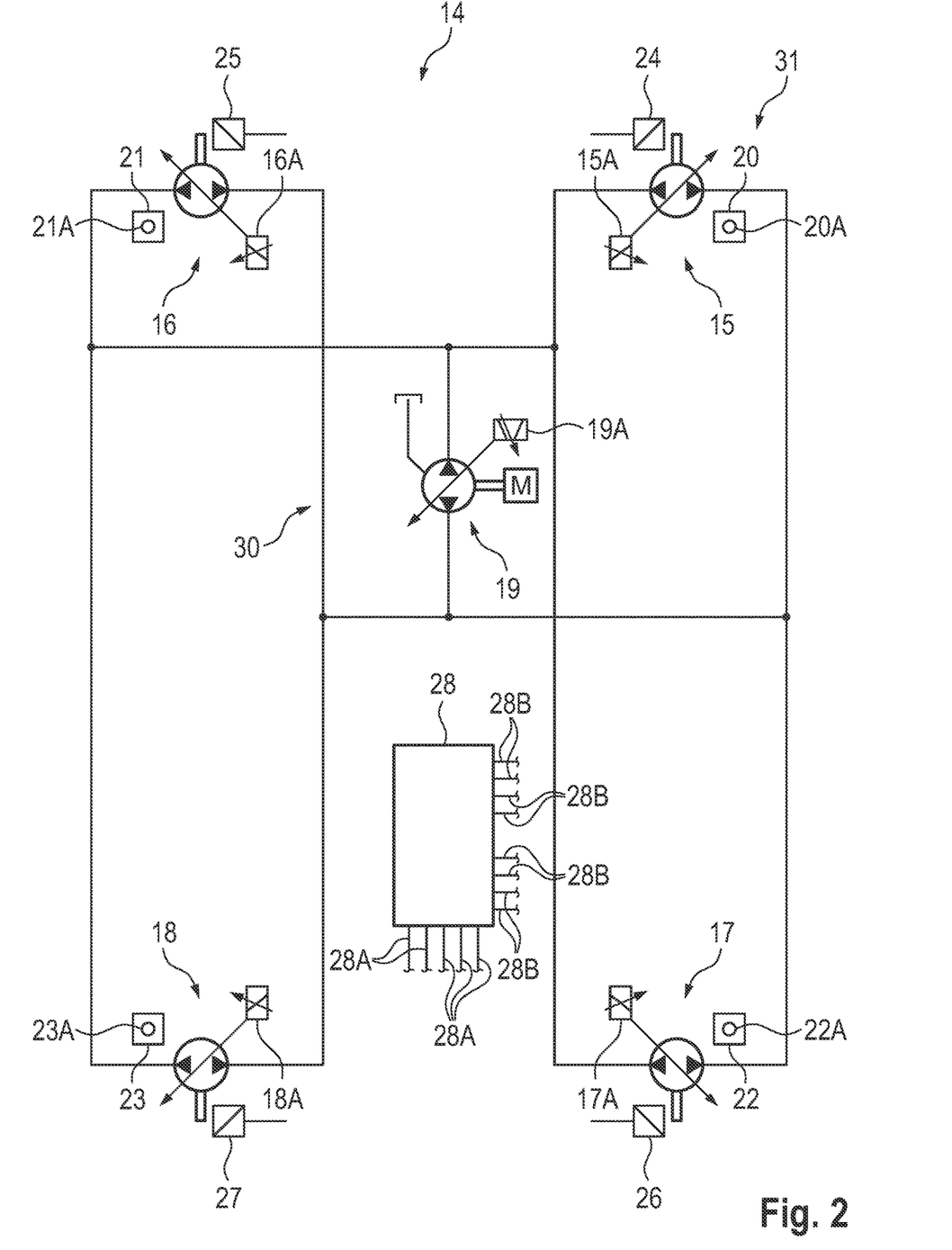
FIG. 2 shows a first embodiment of the control device for the adjustable hydraulic motors of the self-propelled construction machine.

The hydrostatic drive device 14 comprises, relative to the working direction, a front right hydraulic motor 15 associated with the front right running gear 10B, a front left hydraulic motor 16 associated with the front left running gear 10A, a rear right hydraulic motor 17 associated with the rear right running gear 11B and a rear left hydraulic motor 18 associated with the rear left running gear 11A. The hydraulic motors are adjustable hydraulic motors 15, 16, 17, 18, which comprise an adjusting device 15A, 16A, 17A, 18A for setting the displacement volume Vg. Hydraulic motors of this kind belong to the prior art. The hydraulic motors can be, for example, axial piston motors which have a cylindrical rotating part having axial bores for receiving pistons. The adjusting device can be an electric actuator which adjusts the rotating part of the axial piston motor depending on a control voltage or a control current, so that the displacement volume Vg varies.

The adjustable hydraulic motors 15, 16, 17, 18 are supplied with hydraulic fluid by a travel drive-hydraulic pump 19. The travel drive-hydraulic pump 19 is driven by at least one drive motor M (schematically shown in FIGS. 2 and 6), which may be an internal combustion engine. In the present embodiment, only one travel drive-hydraulic pump 19 is provided to supply the hydraulic motors of all of the running gears. However, the drive device 14 can also comprise, for example, two travel drive-hydraulic pumps, of which one hydraulic pump provides, for example, hydraulic fluid for the front running gears and the other pump provides hydraulic fluid for the rear running gears.

The travel drive-hydraulic pump 19 is an adjustable hydraulic pump comprising an adjusting device 19A, for example an electric actuator, so that the volume flow is variable.

The construction machine also comprises a steering device 31. Steering device-operating devices 20, 21, 22, 23 (actuators; only suggested in FIG. 2), which can be piston/cylinder arrangements engaging with the running gears, are associated with the individual running gears 10A, 10B, 11A, 11B. The steering device-operating devices of the steering device 31 have steering angle sensors 20A, 21A, 22A, 23A which generate a steering angle signal depending on the steering angle of the particular running gear.

In addition, speed sensors 24, 25, 26, 27 (only suggested in the drawings) are associated with the individual running gears 20, 21, 22, 23, which speed sensors generate a speed signal depending on the speed n of the running gears or the hydraulic motors 15, 16, 17, 18 associated with the running gears.

To control the adjusting device 19A of the travel drive-hydraulic pump 19 and the adjusting devices 15A, 16A, 17A, 18A of the hydraulic motors 15, 16, 17, 18, a controller 28 is provided, which can be part of the central control and processing unit (not shown) of the construction machine.

The controller 28 is connected, via control lines 28A, to the adjusting device 19A of the travel drive-hydraulic pump 19 and to the adjusting devices 15A, 16A, 17A, 18A of the hydraulic motors 15, 16, 17, 18, and receives, via signal lines 28B, the steering angle signals from the steering angle sensors 20A, 21A, 22A, 23A and the speed signals from the speed sensors 24, 25, 26, 27.

The controller 28 can comprise analogue or digital circuits. For example, it can have a general processor, a digital signal processor (DSP) for continuous processing of digital signals, a microprocessor, an application-specific integrated circuit (ASIC), an integrated circuit consisting of logic elements (FPGA), or other integrated circuits (IC) or hardware components. A data processing program (software) can run on the hardware components in order to be able to control the individual components of the construction machine.

In addition, the hydraulic system comprises hydraulic lines 30 for supplying and discharging the hydraulic fluid. The pressure connection of the travel drive-hydraulic pump 19 is connected to the inlet of the two front and rear hydraulic motors 15, 16, 17, 18 and the outlet of the front and rear hydraulic motors is connected to the suction connection of the travel drive-hydraulic pump 19. The travel drive-hydraulic pump 19 provides a specified total volume flow of hydraulic fluid, which is distributed to the individual hydraulic motors.

The controller 28 is configured in such a way that the adjusting device 19A of the travel drive-hydraulic pump 19 is controlled in such a way that a specific total volume flow Q of hydraulic fluid is provided. The total volume flow Q depends on the desired travel speed v of the construction machine, which can be specified by the vehicle driver.

First of all, it is assumed that all of the running gears 10A, 10B and 11A, 11B are on the ground B and have sufficient static friction (grip) so that the running gears do not slip or spin. In this case, the total volume flow Q of the travel drive-hydraulic pump 19 is ideally divided equally between the hydraulic motors 15, 16, 17, 18. The partial volume flow $Q_1$, $Q_2$, $Q_3$, $Q_4$ of each hydraulic motor is 25% of the total volume flow. As a result, 25% of the drive power is available to each running gear (drive losses are negligible).

On the other hand, if a running gear 10A, 10B and 11A, 11B slips, the speed of the running gear or the hydraulic motor increases as a result of the lower torque that the hydraulic motor 15A, 16A, 17A, 18A associated with the running gear in question has to generate (slippage), which results in an increase in the partial volume flow $Q_1$, $Q_2$, $Q_3$, $Q_4$ of the hydraulic motor. As a result, the partial volume flows $Q_1$, $Q_2$, $Q_3$, $Q_4$ of the other hydraulic motors decrease accordingly. While one running gear slips, the other running gears can no longer drive the construction machine with sufficient power. The invention intends to prevent this, as described below.

The controller 28 is configured in such a way that the following method steps are carried out.

First, the case of the construction machine travelling straight ahead will be described. In this case, the controller 28 receives a steering angle signal which corresponds to a steering angle of zero. It is assumed that the front right running gear 10B slips, which leads to an increase in its partial volume flow. This is intended to be prevented.

The controller 28 first calculates a partial volume flow $Q_1$, $Q_2$, $Q_3$, $Q_4$ for each adjustable hydraulic motor 15, 16, 17, 18 from the total volume flow Q provided by the at least one travel drive-hydraulic pump 19. When travelling straight ahead, all of the running gears 10A, 10B and 11A, 11B should have the same travel speed $v_1$, $v_2$, $v_3$, $v_4$ or the hydraulic motors 15, 16, 17, 18 should turn at the same speed $n_1$, $n_2$, $n_3$, $n_4$. Consequently, the individual hydraulic motors should each be supplied with 25% of the total volume flow.

The controller 28 thus calculates the partial volume flow $Q_1$, $Q_2$, $Q_3$, $Q_4$ of each hydraulic motor 15, 16, 17, 18 from the quotient of the total volume flow Q and the number A of the driven running gears ($Q_1=Q/A$, $Q_2=Q/A$, $Q_3=Q/A$, $Q_4=Q/A$).

The controller 28 controls the adjusting device 15A, 16A, 17A, 18A of the hydraulic motor 15, 16, 17, 18 in such a way that a displacement volume Vg is set for the hydraulic motor, at which displacement volume the partial volume flow determined for the hydraulic motor is set.

The partial volume flow $Q_1$, $Q_2$, $Q_3$, $Q_4$ is calculated from the speed n of the particular hydraulic motor and its displacement volume Vg according to the following equation:

$$Q_{1,2,3,4} = Vg \times n$$

The controller 28 can therefore calculate the displacement volume Vg of the hydraulic motor from the specified partial volume flow $Q_1$, $Q_2$, $Q_3$, $Q_4$ and the (known) speed n of the hydraulic motor ($Vg=Q_{1,2,3,4}/n$).

The controller 28 is configured in such a way that the partial volume flow $Q_1$, $Q_2$, $Q_3$, $Q_4$ previously determined for the particular hydraulic motor 15, 16, 17, 18 is kept constant ($Q_1=Q_2=Q_3=Q_4=$constant).

The variation in the displacement volume Vg due to the controller 28 keeps the partial volume flow constant. In the phase in which the partial volume flow is kept constant, the remaining torque cannot be in equilibrium with the remaining traction, i.e. slippage can occur. The running gear in question can still spin due to external influences and only these external influences can ensure that it grips again.

During the slippage, however, the control system ensures that the running gear in question is not supplied with any amount of the total volume flow, which would result in the other running gears, which have sufficient traction, not being supplied or only being supplied with a low volume flow. The control system according to the invention therefore ensures that the running gears that are not spinning are supplied with a sufficient amount of hydraulic fluid.

If, for example, the front right running gear 10B begins to spin, as a result of which the speed n of the hydraulic motor 15 begins to increase, which would result in an increase in the partial volume flow $Q_2$ of the front right running gear, the controller reduces the displacement volume Vg of the hydraulic motor. As a result, the speed n of the hydraulic motor or the running gear initially increases further. However, an operating point then arises at which the partial volume flow $Q_2$ assumes its setpoint again. The controller 28 thus sets the displacement volume Vg of the hydraulic motor in question in such a way that the partial volume flow $Q_1$, $Q_2$, $Q_3$, $Q_4$ specified for the hydraulic motor is maintained or restored when the construction machine is advancing.

Since the partial volume flows $Q_1$, $Q_2$, $Q_3$, $Q_4$ are the same, i.e. the front right running gear 10B does not receive more hydraulic fluid than the other running gears 10A and 11A, 11B even with insufficient static friction, the traction is considerably improved. In the present embodiment, 75% of the tensile force is retained.

When cornering, the controller 28 does not divide the total volume flow Q equally, but rather unequally into the partial volume flows. The partial volume flows $Q_1$, $Q_2$, $Q_3$, $Q_4$ for the adjustable hydraulic motors 15, 16, 17, 18 are divided depending on the curve radius r of the particular running gear.

Figure 3:
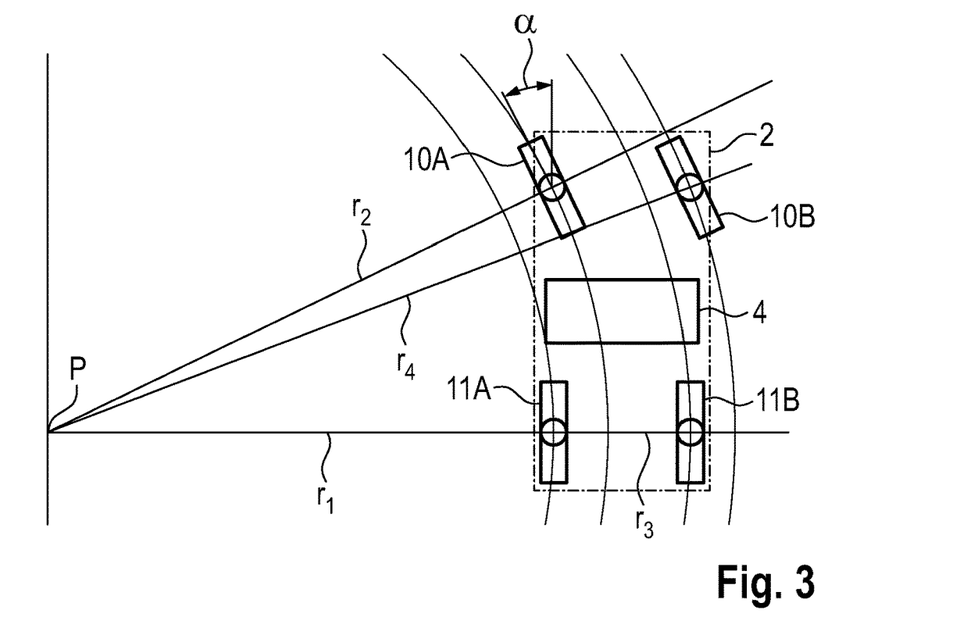
FIG. 3 shows the position of the running gears of a construction machine comprising two steerable front running gears during cornering in a greatly simplified schematic representation.

FIG. 3 shows the machine frame 2 comprising the front and rear running gears 10A, 10B and 11A, 11B and the milling drum 4 of the construction machine when cornering. In the present embodiment, only the front running gears 10A, 10B are steerable running gears ("front wheel steering"). The steering angles of the front running gears 10A are set in such a way that the extensions of axes that are perpendicular to the steerable front running gears 10A, 10A intersect at the instantaneous centre of rotation P. The axes that are perpendicular to the non-steerable rear running gears 11A, 11B also intersect at the instantaneous centre of rotation P (Ackermann condition). When cornering, the running gears 10B, 11B on the outside of the curve must move at a higher speed v than the running gears 10A, 11A on the inside of the curve. Consequently, the speed n of the hydraulic motors of the running gears on the outside of the curve must be greater than the speed n of the hydraulic motors of the running gears on the inside of the curve. This results in different partial volume flows $Q_1$, $Q_2$, $Q_3$, $Q_4$ for the hydraulic motors.

Figure 4:
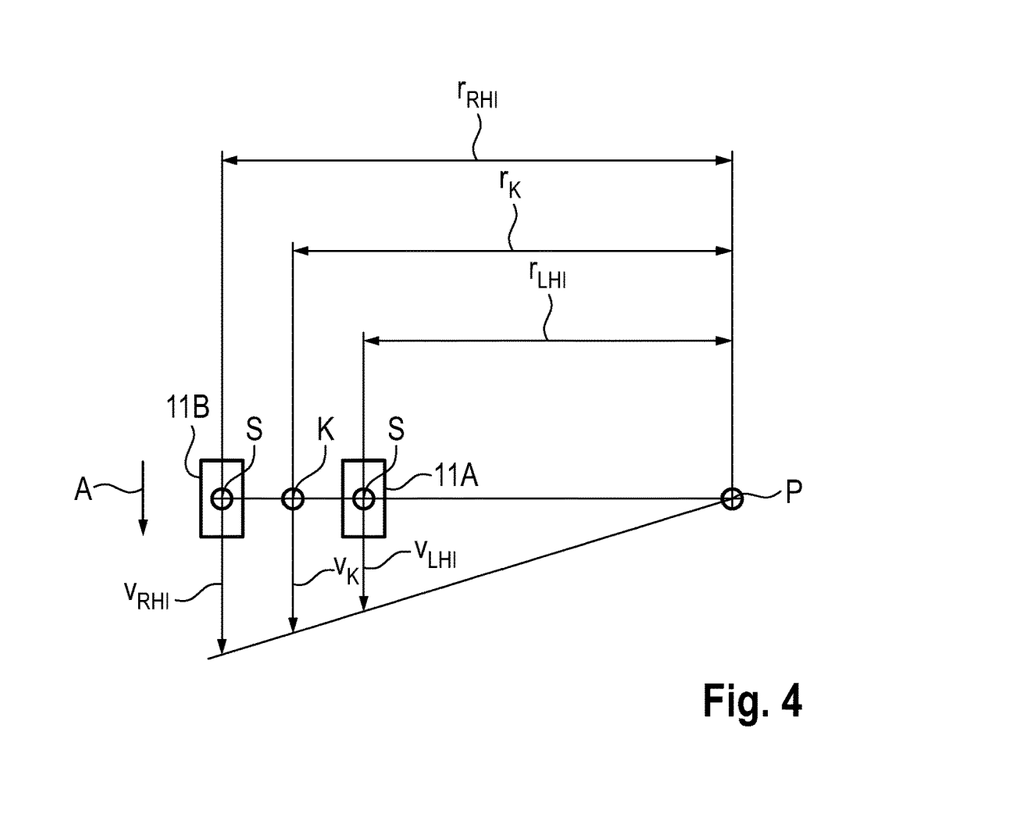
FIG. 4 shows the position of the rear running gears of the construction machine from FIG. 3 during cornering in a greatly simplified schematic representation.

FIG. 4 shows the speed vectors $v_{LHI}$ and $v_{RHI}$ of the rear running gears 11A, 11B for the case of "front wheel steering", the running gears being controlled in relation to the vehicle reference point K, i.e. the speed $v_k$ of the vehicle reference point K when travelling straight ahead and the speed $v_k$ of the vehicle reference point K when cornering are the same. The distance from a reference point S of the right rear running gear 11B, relative to the working direction A, to the instantaneous centre of rotation P is denoted by $r_{RHI}$, and the distance from a reference point S of the left rear running gear 11A to the instantaneous centre of rotation P is denoted by $r_{LHI}$ (FIG. 3). The distance from the vehicle reference point K lying between the two reference points S to the instantaneous centre of rotation P is denoted by $r_k$.

When cornering, as shown in FIG. 4, a higher speed is set for the rear running gear 11B on the outside of the curve than for the rear running gear 11A on the inside of the curve. The speeds of the running gear 11B on the outside of the curve and the running gear 11A on the inside of the curve depend on the radii $r_{RHI}$ and $r_{LHI}$. To ascertain the speeds for the running gears 11B, 11A on the outside and inside of the curve, the vehicle reference speed $v_k$ is multiplied by a factor which is greater than 1 for the running gear on the outside of the curve and less than 1 for the running gear on the inside of the curve. This factor depends on the radius or steering angle that is detected using the steering angle sensors 20, 21, 22, 23. Since the speed of the running gears 10A, 10B and 11A, 11B is proportional to the speed of the hydraulic motors 15, 16, 17, 18, there is also a corresponding factor for their speeds, which is used by the controller 28 when calculating the partial volume flows $Q_1$, $Q_2$, $Q_3$, $Q_4$.

The construction machine according to the invention provides various steering modes, which can include "front axle steering", "rear axle steering", "front and rear axle steering" and/or "coordinated steering" or "crab steering". During "crab steering", the front and rear running gears steer in the same direction, the steering angles of the running gears being the same.

Figure 5A:
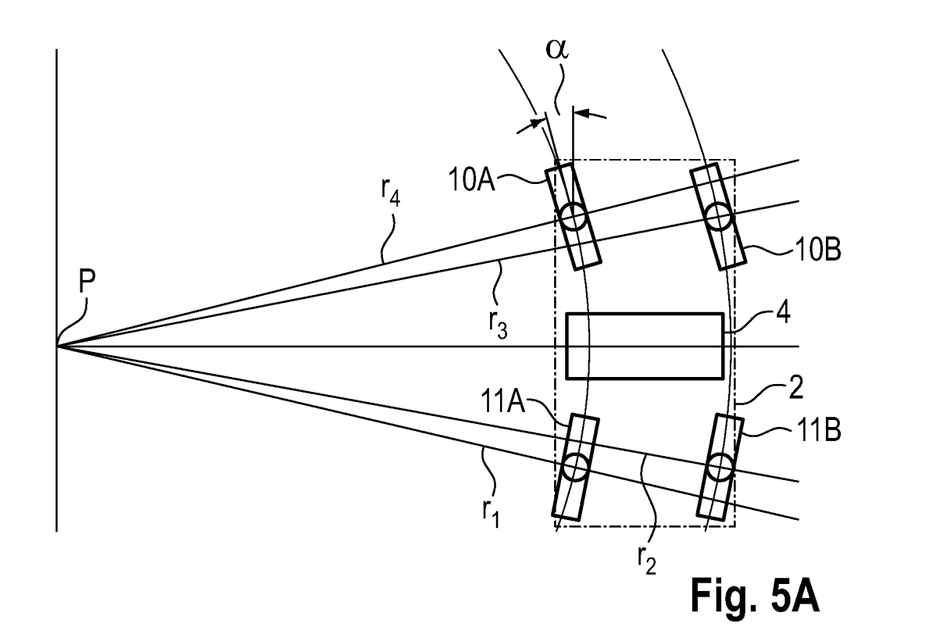
FIG. 5A shows the position of the running gears of a construction machine comprising steerable front and rear running gears during cornering in a greatly simplified schematic representation.
Figure 5B:
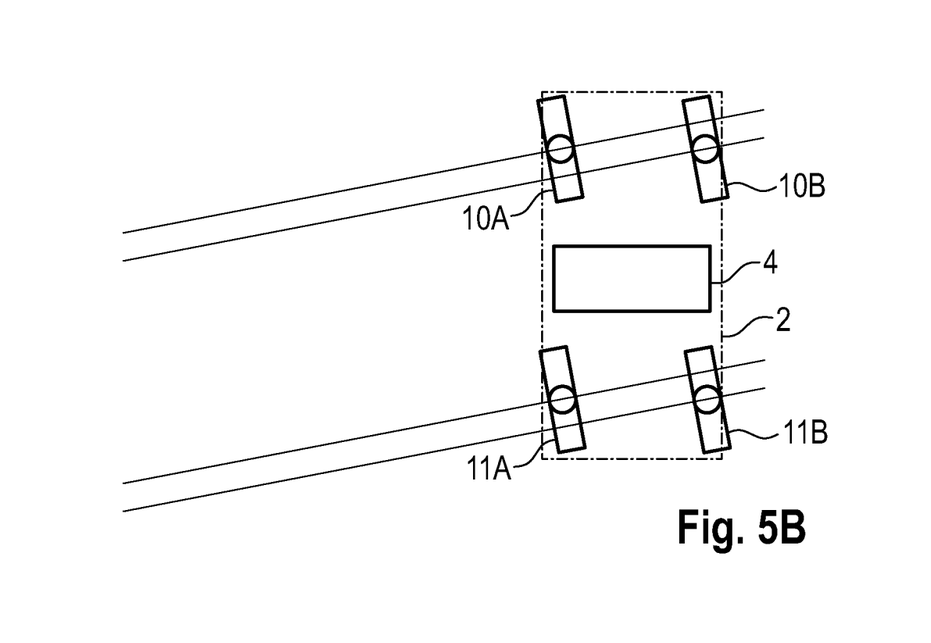
FIG. 5B shows the position of the running gears of a construction machine in the "crab steering" steering mode.

FIG. 5A shows an embodiment of a construction machine having "coordinated steering", the front and rear running gears 10A, 10B and 11A, 11B being steerable running gears. The axes perpendicular to the steerable running gears intersect at the instantaneous centre of rotation P (Ackermann condition). The construction machine having the steerable front and rear running gears 10A, 10B and 11A, 11B also provides the "crab steering" steering mode (FIG. 5B) in addition to the "coordinated steering" steering mode (FIG. 5A). In this "crab steering" steering mode, the axes that are perpendicular to the steerable running gears intersect at infinity.

The particular steering mode can be specified by the vehicle driver on the operating panel 7. The steering device 31 is configured in such a way that the direction in which the running gears steer and the steering angle are set depending on the steering mode.

The controller 28 is configured in such a way that the total volume flow Q is divided into the partial volume flows $Q_1$, $Q_2$, $Q_3$, $Q_4$ for the adjustable hydraulic motors 15, 16, 17, 18 depending on not only the steering angle, but also depending on the specified steering mode, i.e. is taken into account when controlling the steering mode.

If the front and rear right and left running gears 10A, 10B, 11A, 11B of the construction machine are steerable running gears and the steering mode is set to, for example, "crab steering", the steering device-operating devices set the running gears in such a way that the running gears steer in the same direction and all of the running gears have the same steering angle. In this case, all of the running gears should move at the same advancing speed, although the running gears are turned.

The controller is configured for the "crab steering" steering mode in such a way that the total volume flow Q is divided equally into the partial volume flows ($Q_1$, $Q_2$, $Q_3$, $Q_4$) for the adjustable hydraulic motors (15, 16, 17, 18) regardless of the steering angle. In this respect, the control system also takes the steering mode into account.

Taking into account the "crab steering" steering mode is particularly important in milling machines comprising a milling drum, since a steering mode of this kind is generally provided in milling machines.

For steering modes other than "crab steering", other distributions of the volume flow may occur. In the case of "coordinated steering" (FIG. 5A), compared to "front-wheel steering" (FIG. 3), for example, it must be taken into account that the left, front and rear or right, front and rear running gears 10A, 11A and 10B, 11B move on a common circular path during "coordinated steering", whereas during "front axle steering" or "rear axle steering" each running gear moves on its own circular path. The steering angle α of the front right and left running gear 10A, 10B during "coordinated steering" (FIG. 5A) is smaller than the steering angle α during "front axle steering" (FIG. 3). Taking into account the specified "coordinated steering" or "front axle steering" or "rear-axle steering" steering mode, the controller 28 provides a distribution of the total volume flow depending on four different radii $r_1$, $r_2$, $r_3$, $r_4$ ("coordinated steering") or two different radii $r_1$, $r_2$ ("front axle or rear axle steering"). Consequently, the controller 28 sets a different partial flow for the "front axle or rear axle steering" for each hydraulic pump 15, 16, 17, 18.

Figure 6:
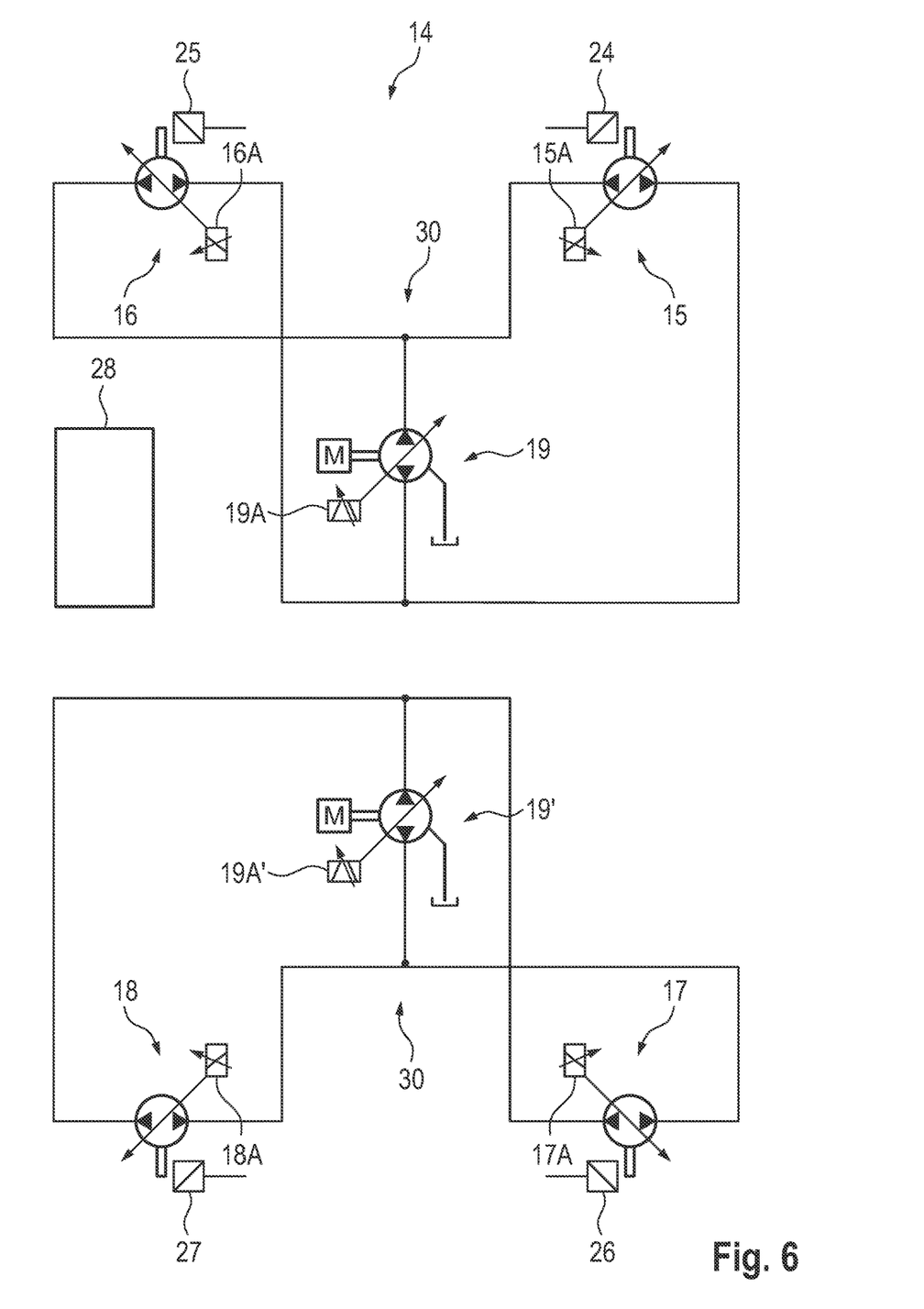
FIG. 6 shows a second embodiment of the control device for the adjustable hydraulic motors of the self-propelled construction machine.

FIG. 6 shows the hydraulic circuit diagram of an alternative embodiment of a drive device 14, which differs from the drive device of FIG. 2 in that two travel drive-hydraulic pumps 19, 19' are provided instead of one travel drive-hydraulic pump 19, the first travel drive-hydraulic pump 19 providing the volume flow for the front right hydraulic motor 15 and the front left hydraulic motor 16 and the second travel drive-hydraulic pump 19' providing the volume flow for the rear right hydraulic motor 17 and the rear left hydraulic motor 18. Corresponding parts are provided with the same reference numerals in FIG. 5 as in FIG. 2. In this embodiment, the total volume flow Q is provided by both travel drive-hydraulic pumps 19, 19'. The control system is analogous to that of the embodiment of FIG. 2.

The invention claimed is:

1. A method of controlling a self-propelled construction machine, the self-propelled construction machine including a machine frame, at least three running gears configured to support the machine frame, at least two of the running gears being drivable running gears, a work roller supported from the machine frame, and a hydraulic drive configured to drive the at least two drivable running gears, the hydraulic drive including a plurality of adjustable hydraulic motors, each adjustable hydraulic motor being connected to an associated one of the drivable running gears, each adjustable hydraulic motor having a variable displacement volume variable by an actuator, and the hydraulic drive further including at least one adjustable travel drive hydraulic pump driven by at least one drive motor to supply the adjustable hydraulic motors with a variable total volume flow of hydraulic fluid, the method comprising steps of:

providing the variable total volume flow of hydraulic fluid from the at least one adjustable travel drive hydraulic pump dependent upon a desired travel speed;

determining a partial volume flow for the operation of each adjustable hydraulic motor from the variable total volume flow; and when a speed of one of the adjustable hydraulic motors increases as a result of slippage of an associated one of the running gears, adjusting the respective actuator of the associated one of the adjustable hydraulic motors such that a displacement volume is set for the associated one of the adjustable hydraulic motors at which displacement volume the partial volume flow determined for the associated one of the adjustable hydraulic motors is maintained.

2. The method of claim 1, at least one of the running gears being a steerable running gear having an adjustable steering angle, the method further comprising:
  determining the partial volume flow for the adjustable hydraulic motor associated with the steerable running gear from the total volume flow depending on the steering angle of the at least one steerable running gear.

3. The method of claim 2, wherein:
  when travelling straight ahead such that the steering angle of the at least one steerable running gear is zero, equally dividing the total volume flow into the partial volume flows for the adjustable hydraulic motors.

4. The method of claim 2, wherein:
  when cornering such that the steering angle of the at least one steerable running gear is not zero, dividing the total volume flow into the partial volume flows for the adjustable hydraulic motors depending on a curve radius of the at least one steerable running gear.

5. The method of claim 1, the construction machine being configured to provide a plurality of selectable steering modes, wherein:
  the determining of the partial volume flow for each adjustable hydraulic motor from the variable total volume flow is done depending on which one of the steering modes is selected.

6. The method of claim 1, the at least three running gears including a plurality of steerable running gears each having an adjustable steering angle, the method further comprising:
  setting the steering angles of the steerable running gears such that extensions of axes perpendicular to the steerable running gears intersect at an instantaneous center of rotation.

7. The method of claim 1, wherein:
  the at least three running gears include relative to a working direction of the construction machine, a steerable front right running gear, a steerable front left running gear, a steerable rear right running gear and a steerable rear left running gear; and the plurality of adjustable hydraulic motors include a front right adjustable hydraulic motor associated with the steerable front right running gear, a front left adjustable hydraulic motor associated with the steerable front left running gear, a rear right adjustable hydraulic motor associated with the steerable rear right running gear, and a rear left adjustable hydraulic motor associated with the steerable rear left running gear.

8. The method of claim 1, wherein:
  the step of providing the variable total volume flow of hydraulic fluid from the at least one adjustable travel drive hydraulic pump includes providing the variable total volume flow of hydraulic fluid for all of the adjustable hydraulic motors from only one adjustable travel drive hydraulic pump.

9. The method of claim 1, wherein:
  the at least three running gears include a front right running gear, a front left running gear, a rear right running gear and a rear left running gear;
  the plurality of adjustable hydraulic motors include a front right adjustable hydraulic motor associated with the front right running gear, a front left adjustable hydraulic motor associated with the front left running gear, a rear right adjustable hydraulic motor associated with the rear right running gear, and a rear left adjustable hydraulic motor associated with the rear left running gear; and
  the step of providing the variable total volume flow of hydraulic fluid from the at least one adjustable travel drive hydraulic pump includes:
    providing a first volume flow for the front right adjustable hydraulic motor and the front left adjustable hydraulic motor from a first adjustable travel drive hydraulic pump; and
    providing a second volume flow for the rear right adjustable hydraulic motor and the rear left adjustable hydraulic motor from a second adjustable travel drive hydraulic pump.

* * * * *